US007577422B2

(12) United States Patent
Laiho et al.

(10) Patent No.: US 7,577,422 B2
(45) Date of Patent: Aug. 18, 2009

(54) LAWFUL INTERCEPTION OF MULTIMEDIA CALLS

(75) Inventors: Keijo Laiho, Masala (FI); Paolo Valassi, Voghera (IT)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 471 days.

(21) Appl. No.: 10/551,913

(22) PCT Filed: Apr. 9, 2003

(86) PCT No.: PCT/EP03/50098

§ 371 (c)(1),
(2), (4) Date: Oct. 3, 2005

(87) PCT Pub. No.: WO2004/091250

PCT Pub. Date: Oct. 21, 2004

(65) Prior Publication Data

US 2006/0264200 A1 Nov. 23, 2006

(51) Int. Cl.
*H04M 1/66* (2006.01)
*H04M 1/68* (2006.01)
*H04M 3/16* (2006.01)
*H04L 29/08* (2006.01)
*H04J 3/22* (2006.01)

(52) U.S. Cl. ............... 455/410; 455/414.1; 370/270
(58) Field of Classification Search .......... 445/410, 445/411, 414.4
See application file for complete search history.

(56) References Cited

U.S. PATENT DOCUMENTS

| 5,892,811 A * | 4/1999 | Armbruster et al. ......... 379/7 |
| 6,373,817 B1 * | 4/2002 | Kung et al. ............. 370/217 |
| 6,847,623 B1 * | 1/2005 | Vayanos et al. ......... 370/335 |
| 2002/0151992 A1 * | 10/2002 | Hoffberg et al. .......... 700/83 |
| 2004/0157629 A1 * | 8/2004 | Kallio et al. ............ 455/466 |

FOREIGN PATENT DOCUMENTS

| EP | 1 389 862 A | 2/2004 |
| WO | WO 01 47222 A | 6/2001 |
| WO | WO 01 91374 A | 11/2001 |
| WO | WO 02 085041 A | 10/2002 |
| WO | WO 02 093838 A | 11/2002 |
| WO | WO 03 049357 A | 6/2003 |

\* cited by examiner

*Primary Examiner*—Patrick N. Edouard
*Assistant Examiner*—Michael T Thier

(57) ABSTRACT

A method of performing lawful interception of a multimedia call between two or more terminals. The method comprises detecting the initiation of said call at monitoring equipment located in the call path, and forwarding from the monitoring equipment to a gateway, parameters defining at least one of the forward and reverse channels of said call. At least one multimedia call is set up from said gateway to a monitoring terminal in dependence upon the received parameters. Following the setting up of the first mentioned multimedia call, forward and/or reverse channel data is intercepted at said monitoring equipment, the intercepted data routed to said gateway, and the data transmitted to the monitoring terminal over the forward channel of the or each second mentioned multimedia call.

8 Claims, 4 Drawing Sheets

LAWFUL INTERCEPTION OF MULTIMEDIA CALLS

FIELD OF THE INVENTION

The present invention relates to the lawful interception of multimedia calls within a communications network.

BACKGROUND TO THE INVENTION

The introduction of new communication systems including third generation mobile networks (3 G) and broadband IP networks will result in a wide range of services being available to users. Not least amongst these services will be the possibility for multimedia (MM) calls between users, allowing video telephony and the exchange of data.

There are circumstances in which authorised agencies such as the police and intelligence services must be able to monitor calls including multimedia calls. Such lawful interception is required in order to be able to collect information on those suspected of involvement in criminal or terrorist activities. The lawful interception of traditional voice call has been handled in two ways:

1) The voice streams coming from the subscribers involved in a call to be intercepted are mixed together by monitoring equipment located in one of the "switches" involved in the call. The mixed stream is sent, by establishing an ancillary call, to the monitoring centre. Thus the mixed stream, i.e. the complete conversation between the parties, can be played for example using an ordinary loudspeaker in the monitoring centre.

2) The voice streams coming from the subscribers involved in the intercepted call are not mixed, but rather two connections are established from the monitoring equipment to the monitoring centre, each carrying one leg of the call. This allows the monitoring centre to record the voices of the two call parties separately and/or mix the voice streams in the monitoring centre.

The lawful interception of multimedia calls is more problematic than for voice calls. The protocols used to set up a multimedia call between terminals require handshaking between the participating terminals. The handshaking is used to agree upon parameters describing the payload of the call and how the payload is to be transported. The parameters to describe the payload include a used codec and codec options (e.g. video codecs such as H263 and MPEG4 include a number of optional features, the main purpose of which are to either improve the picture quality or decrease the used bandwidth, or both). Transport parameters include for example payload format, e.g. the format of the RTP-packet to be used to carry a data stream in IP based transport network, or H223 logical channel parameters used in narrowband multimedia H.324. H223 logical channel parameters include parameters specifying whether payload frames are allowed to be segmented into several H223 multiplex frames, whether the payload frames are numbered, etc.

FIG. 1 illustrates for example a handshake between two terminals according to the ITU-T H.245 protocol (where "OLC" designates Open Logical Channel signaling messages). In the lawful interception scenario, it is not possible to involve the monitoring centre in the handshaking process as two terminals are already involved in the process and in any case it is undesirable to alert a terminal associated with a call to the interception action. For multimedia calls therefore, according to current interception processes, normal multimedia equipment (e.g. mobile handsets) cannot be used in the monitoring centre to decode and display the media. Interception can only be achieved using specialist equipment installed at the monitoring centre.

SUMMARY OF THE INVENTION

According to a first aspect of the present invention there is provided a method of performing lawful interception of a multimedia call between two or more terminals, the method comprising:
  detecting the initiation of said call at monitoring equipment located in the call path;
  forwarding from the monitoring equipment to a gateway, parameters defining at least one of the forward and reverse channels of said call;
  setting up at least one multimedia call from said gateway to a monitoring terminal in dependence upon the received parameters; and
  following the setting up of the first mentioned multimedia call, intercepting forward and/or reverse channel data at said monitoring equipment, routing the intercepted data to said gateway, and transmitting the data to the monitoring terminal over the forward channel of the or each second mentioned multimedia call.

A main function of the gateway is to map, where necessary, protocols used in the network connecting the terminals involved in the call being intercepted, to protocols used in the network connecting the gateway to the monitoring terminal. These protocols include media control protocols (e.g. H.245), call control protocols (ISUP, H.225), multiplexing protocols (H.223), and audio and video codec protocols.

In one embodiment of the present invention, said terminals are H.324 terminals and a multimedia call is established between these terminals via circuit switched networks. The monitoring terminal is an H.323 or SIP terminal, and communicates with said gateway via a broadband IP network.

Preferably, said monitoring equipment forwards to said gateway, signalling messages exchanged between the terminals involved in the call being intercepted. The gateway uses the information contained in these messages to setup the multimedia call(s) to the monitoring terminal and/or to setup transcoding functions within the gateway. The need for transcoding is determined primarily by the properties of the monitoring terminal, as well as the properties of the gateway.

The method may comprise setting up a call from said gateway to the monitoring terminal for each of the forward and reverse channels of the intercepted call. Alternatively, the forward and reverse channels data may be multiplexed/mixed onto the forward channel of a single call established between said gateway and the monitoring terminal. In another alternative, two calls may be established between the gateway and respective terminals at the monitoring centre. Forward channel data from the intercepted call is placed on the forward channel of one of these two calls, whilst reverse channel data is placed on the forward channel of the other one of the calls.

According to a second aspect of the present invention there is provided apparatus for intercepting a multimedia call between two or more terminals, the apparatus comprising:
  means for receiving from monitoring equipment located within the call path, parameters defining at least one of the forward and reverse channels of said call, following detection of the initiation of said call by the monitoring equipment;
  means for setting up at least one multimedia call to a monitoring terminal; and
  means for receiving intercepted forward and/or reverse channel data from said monitoring equipment, and for transmitting the data to a monitoring terminal over the forward channel(s) of the second mentioned multimedia call(s).

DETAILED DESCRIPTION OF A PREFERRED EMBODIMENT

Figure 1:
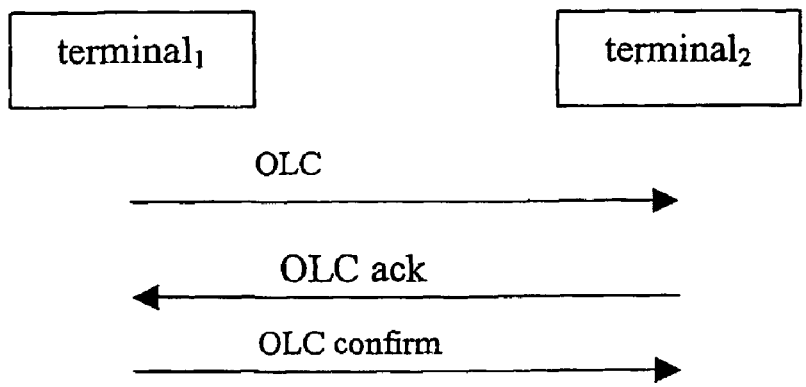
FIG. 1 illustrates handshake signalling between two H.324 terminals.

The following standards will be referred to inter alia in this description of a preferred embodiment of the present invention:

| | |
|---|---|
| ITU-T H.323 | Packet based multimedia communications systems; |
| ITU-T H.324 | Terminal for low bit-rate multimedia communication; |
| ITU-T H.223 | Multiplex protocol for low bit rate multimedia communication; |
| ITU-T H.245 | Control protocol for multimedia communication; |
| 3GPP TS 24.228 | Signalling flows for the IP multimedia call control based on SIP and SDP; |
| 3GPP TS 33.108 | Handover interface for lawful interception. |

By way of explanation, there is now provided a general outline of the various protocols used to establish and control multimedia calls, and of the protocols defining multimedia data types. There will then be provided a description of an embodiment of the invention which provides for the lawful interception of multimedia calls.

Multimedia calls can be divided into two categories: multimedia calls using narrowband circuit connections and multimedia calls using an IP (broadband) network.

In the case of multimedia calls transported over narrowband circuit connections, a known protocol is ITU-T H.324. H.324 uses a mechanism in which different multimedia components are multiplexed into a single data stream, which is transported over the circuit connection. H.223 is used by H.324 as a multiplexing protocol, to multiplex different data streams from different media codecs (e.g. G.723, AMR for audio, and H.263, MPEG4 for video) and the media control protocol (H.245) into a single data stream. The circuit switched call itself might typically be established using ISUP.

In the case of multimedia calls transported over an IP-network, known protocols in this category for establishing and controlling calls are H.323 and Session Initiation Protocol (SIP). The fundamental mechanism for these two protocols is the same. The media control protocol is transported via a TCP/IP (or SCTP/IP) connection between terminals. The media streams are transported by using separate RTP/IP connections for each media between the terminals. H.323 uses H.225 to set up connections between H.323 terminals.

Interworking between these two categories of multimedia calls is generally achieved by using a so-called Video Interactive Gateway (VIG) which makes possible interworking between low bit-rate multimedia terminals (H.324) located in circuit switched telephony networks and terminals in IP based multimedia systems (H.323/SIP). The circuit switched networks may use the 64 kbit/s unrestricted digital bearer for the multimedia connection. Using H.223 as the multiplexing protocol, different multimedia components (audio, video and data) are multiplexed within the circuit switched bearer. These channels are de-multiplexed by the VIG onto separate RTP and TCP channels in the IP network, and vice versa. VIG may perform transcoding for different multimedia components if necessary in order to make communication between end terminals possible.

H.245 may be used as a control protocol both in circuit switched networks and in IP networks, providing end-to-end capability exchange, signalling of command and indications, and messages to open and describe the content of logical channels for different multimedia components. The VIG performs mapping of H.245 messages between a circuit switched network and an IP network, in order to adapt the different transport protocols and to enable transcoding of media channels. The VIG will perform mapping if necessary between the call control protocol in the circuit switched network (ISUP), and that in the IP network (H.225).

Figure 2:
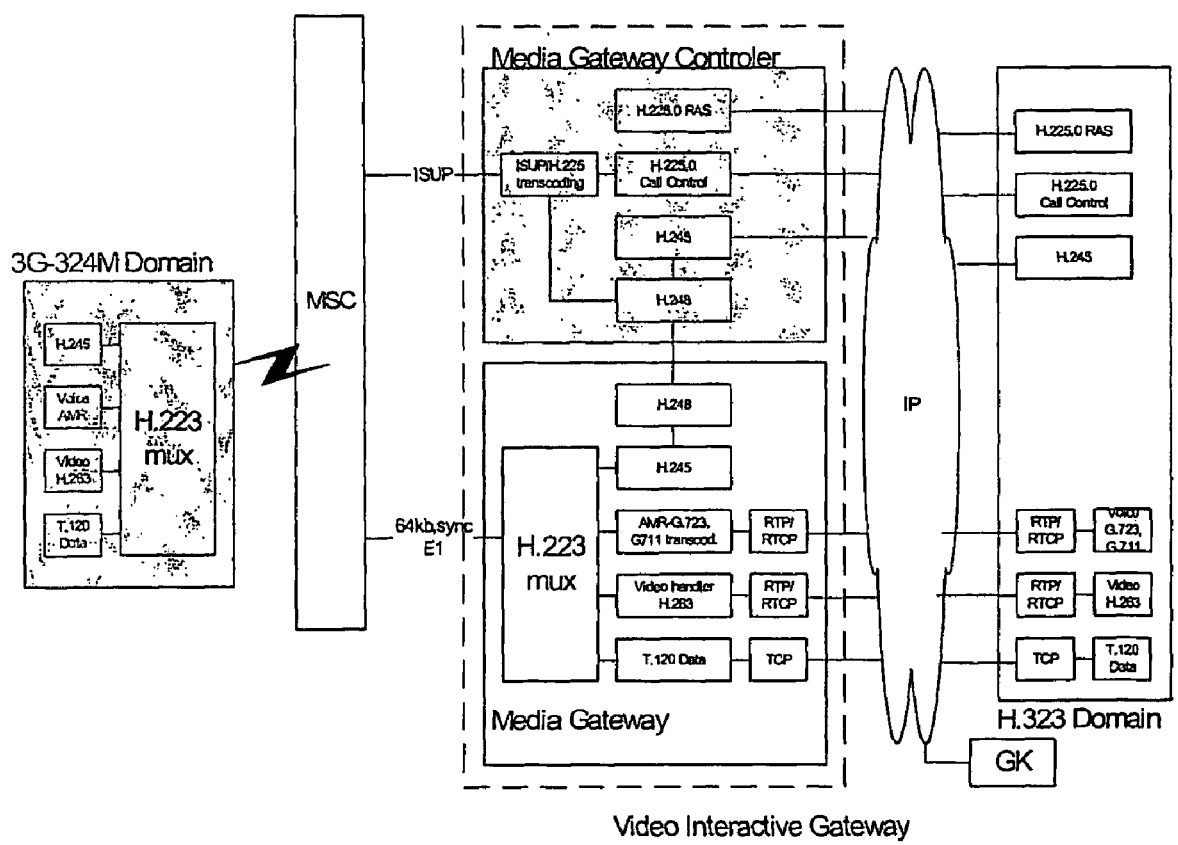
FIG. 2 illustrates schematically a Video Interactive Gateway providing an interface between H.324 and H.323 domains.

FIG. 2 illustrates schematically a VIG interfacing H.324 and H.323 networks. The VIG comprises a Media Gateway operating at the bearer level and providing interworking between user data, and a Media Gateway Controller operating at the call control level and providing interworking between signalling protocols.

It must be possible to carry out the lawful interception of calls between terminals regardless of the protocols used between the terminals. However, this should be possible using some standard piece of equipment on the part of the intercepting authority, i.e. it is not desirable to have to select equipment depending upon the protocols used between callers and upon whether or not a VIG is present in a call path.

Figure 3:
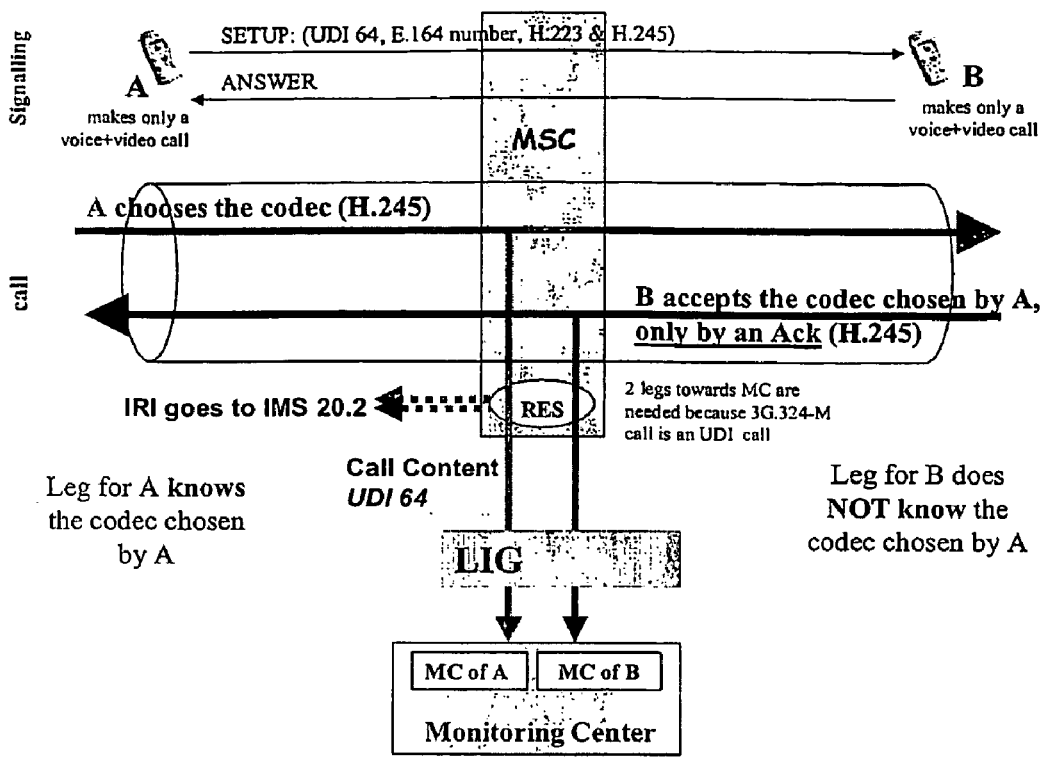
FIG. 3 illustrates the use a Lawful Interception Gateway to intercept two calls between H.324 terminals.

FIG. 3 shows an example lawful interception scenario for a call between two mobile terminals (A and B) having narrowband access (e.g. via a 3 G network), both terminals being H.324 terminals. Monitoring equipment (this essentially being equipment for placing a "tap" on both legs of a call) is located within an MSC of the GSM network. A Lawful Interception Gateway (LIG) provides a gateway between the monitoring equipment and a monitoring centre. The monitoring centre comprises an H.323 terminal coupled to the LIG via a broadband IP network. In a typical scenario, the H.323 terminal at the monitoring centre is implemented on a standard Personal Computer (PC). Whilst the PC might use, for example, Microsoft Netmeeting™ to establish calls with the LIG, the LIG would typically use a proprietary solution for this purpose.

The LIG acts as a VIG (see FIG. 2), translating data between the narrowband and broadband formats. The functions performed by the LIG are as follows:

The LIG listens to the incoming data streams from the monitoring equipment.

It decodes the transport/multiplex protocols (e.g. H.223)

The LIG decodes the relevant information from the media control protocol, i.e. codec information within the Session Description Protocol (SDP) in case where SIP is used in the broadband network, and codec information and other information (e.g. H.223 logical channel parameters within H.245 in case of H.323).

The LIG establishes a connection to a normal multimedia terminal in the monitoring centre based on the received information.

The LIG emulates a normal multimedia terminal towards the normal multimedia terminal within the monitoring centre, by performing the complete media control protocol transactions with that terminal. This includes: 1) invoking the required procedures to connect the media streams for the data coming from the monitoring equipment, and 2) responding correctly to the procedure invocations coming from the terminal in the monitoring centre.

The LIG forwards the media streams coming from the monitoring equipment, over the established connections to the monitoring centre.

Figure 4:
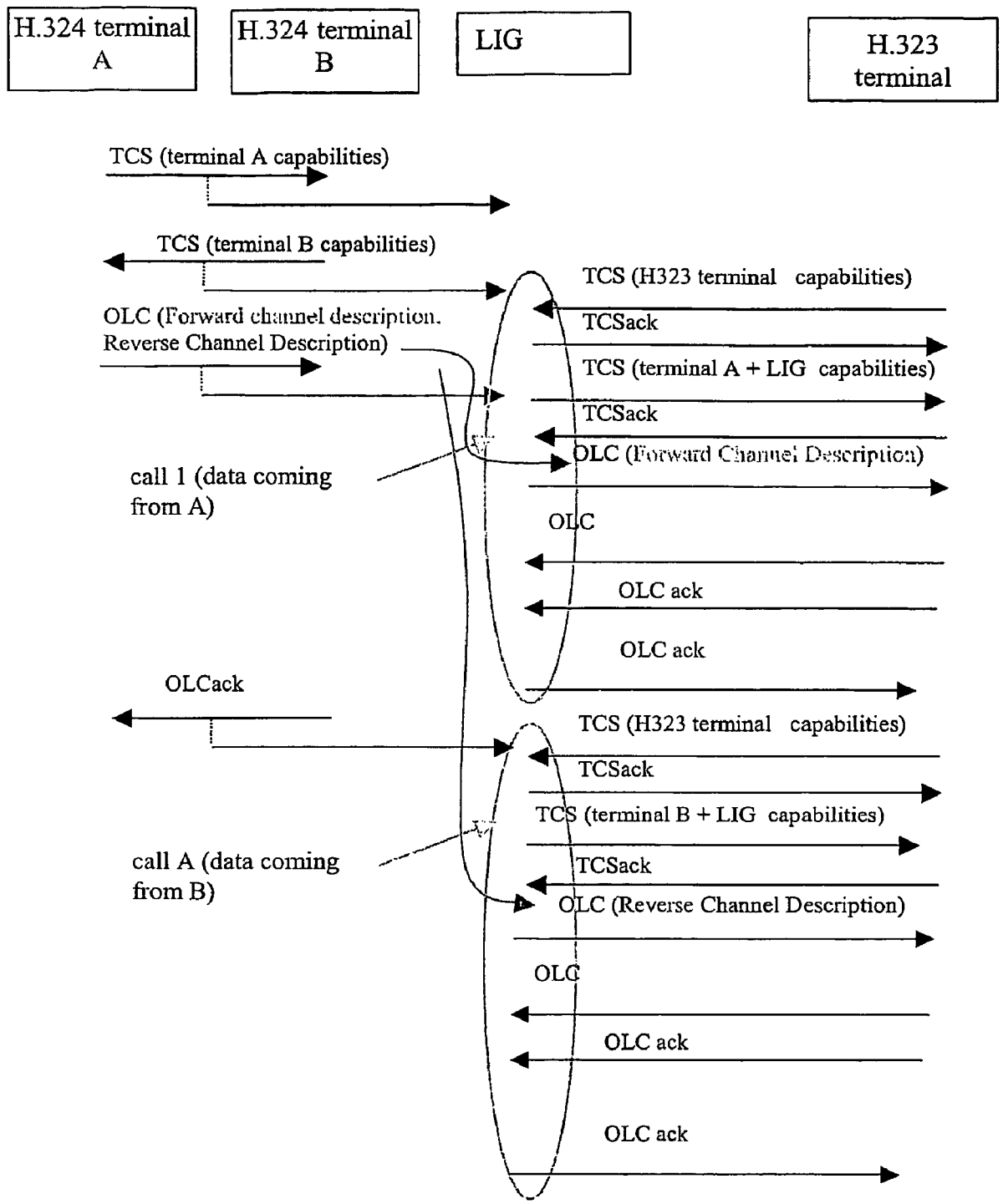
FIG. 4 shows in detail signalling between two H.324 terminals, and between a Lawful Interception Gateway and an H.323 monitoring terminal.

FIG. 4 illustrates signalling exchanges between the H.324 terminals A and B. In order to set up a call between the two terminals, a terminal capabilities exchange procedure (or handshake) is performed. The results of this negotiation are confirmed by terminal A to terminal B in an OLC (Forward Channel Description, Reverse Channel Description) message. The MSC in which the monitoring equipment is located maintains or has access to a database of subscribers for whom lawful interception warrants have been served. When a MM call is initiated to or from a subscriber on whom such an order has been placed, the MSC notifies the LIG. The MSC then forwards to the LIG the entire (64 kbit/s) multiplexed streams, in both the forward and reverse directions, including the OLC (Forward Channel Description, Reverse Channel Description) message sent from terminal A to terminal B.

The LIG examines the parameters of the two legs of the call, and initiates two calls to the H.323 terminal at the monitoring centre. The properties of the forward channel (i.e. which will carry data from the LIG to the monitoring centre) of the first call correspond to the properties of the forward channel of the call between terminals A and B. The properties of the forward channel of the second call correspond to the properties of the reverse channel of the call between terminals A and B. The properties of the reverse channels of the two calls between the LIG and the H.323 terminal are irrelevant as these channels will not be used to carry "live" data.

An assumption here is that the H.323 terminal at the monitoring centre is able to terminate two calls simultaneously, and therefore that the forward and reverse channels of the intercepted call can be carried on respective calls to that H.323 terminal. An alternative mechanism is for the LIG to establish calls to two different H.323 terminals at the monitoring centre, or for a single call to be established with the forward and reverse channel data being multiplexed/mixed onto that single call. An appropriate mechanism may be selected by the LIG based upon a terminal capabilities negotiation with the H.323 terminal.

The LIG may include transcoding capabilities, which makes it possible to use multimedia terminals in the monitoring centre which do not support all possible codecs.

Figure 5:
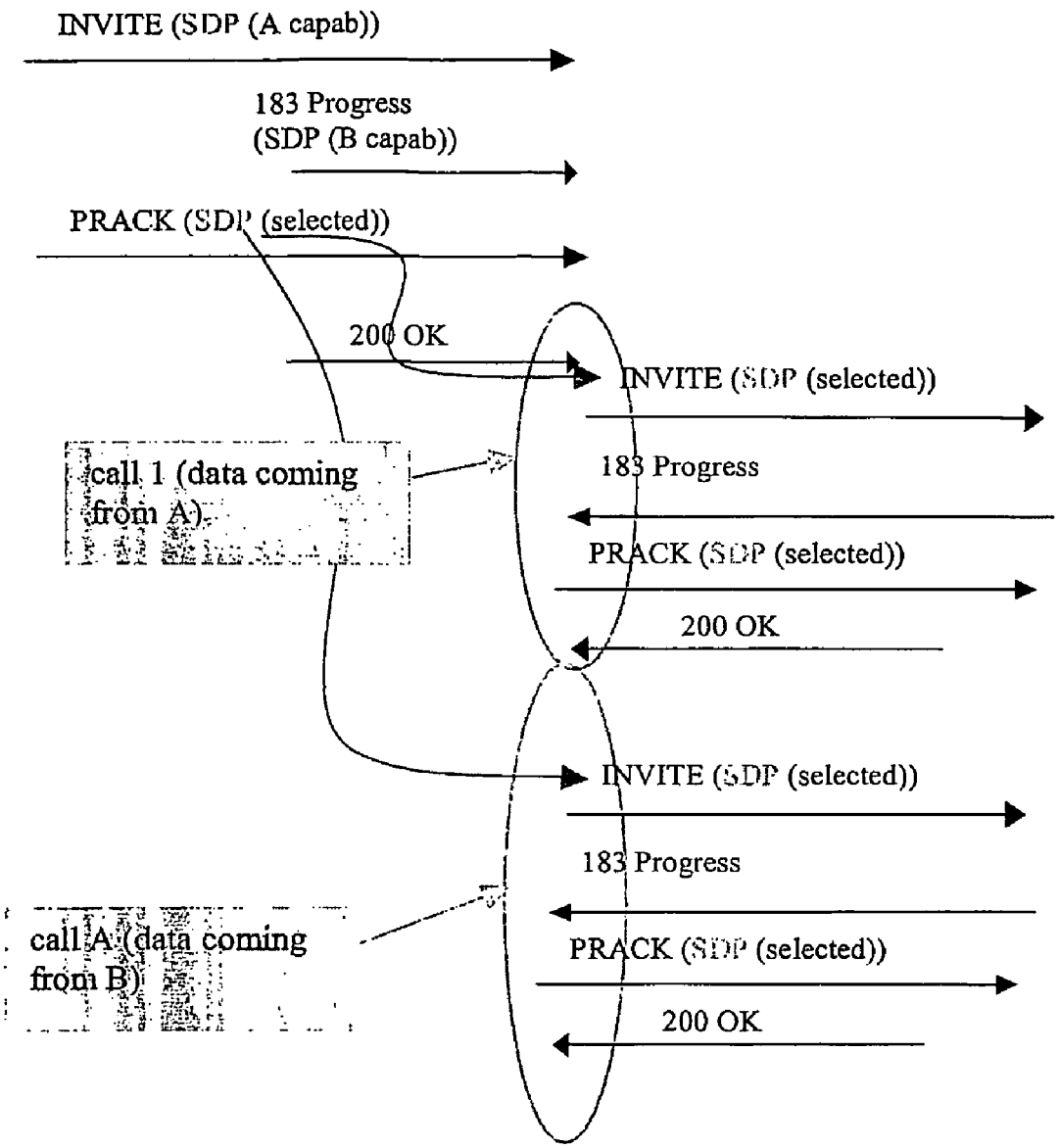
FIG. 5 shows signalling between two SIP terminals, and between a Lawful Interception Gateway and a SIP monitoring terminal.

FIG. 5 illustrates signaling in a scenario where the terminal used at the monitoring centre utilises SIP signaling to establish calls over a broadband IP network to which the LIG is also attached, and in which the two terminal participating in the intercepted call also use SIP signaling. Again, following notification of (forward and reverse channel) parameters by the monitoring equipment at the MSC, the LIG establishes two calls to the SIP terminal at the monitoring centre. It will be appreciated that in this embodiment of the invention the LIG does not provide any VIG functionality.

Figure 6:
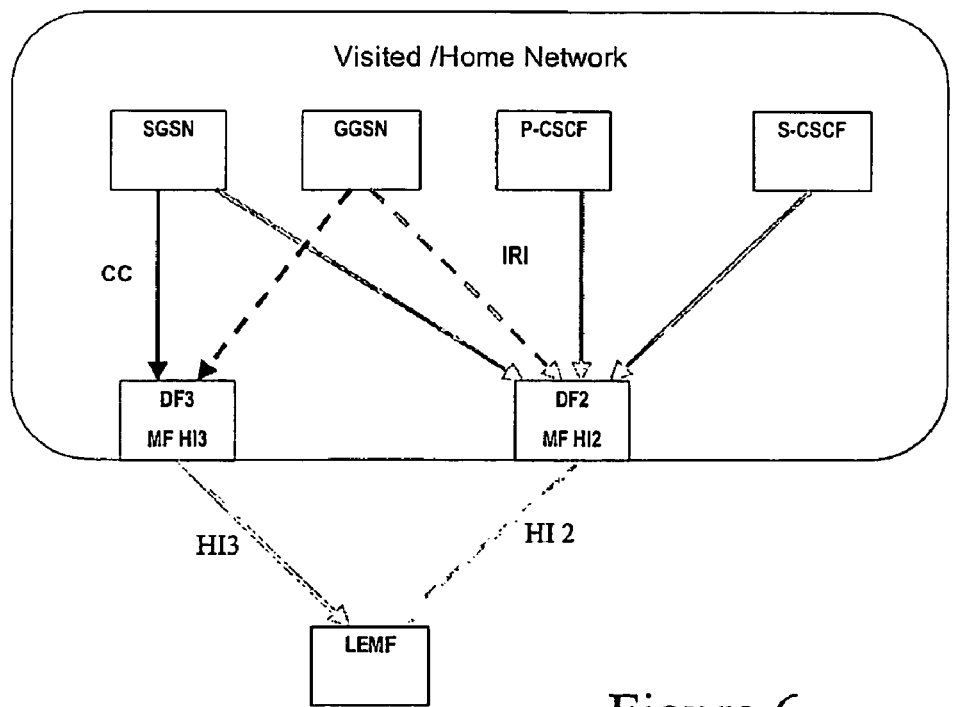
FIG. 6 illustrates network nodes involved in lawful interception where calls are set up using SIP.

FIG. 6 illustrates in more detail the interception procedure. Within the IP multimedia subsystem (IMS), a Proxy CSCF (P-CSCF) participates in SIP signalling. The P-CSCF may be located either in a participating terminal's home network or in a visited network to which that terminal is attached. The P-CSCF identifies the SIP-URL(s) to which SIP signalling belongs. The P-CSCF also has a knowledge of SIP-URLs for which calls are to be intercepted. Using this information, the P-CSCF forwards SIP signalling associated with a call to be intercepted to the LIG as shown in FIG. 5 (the LIG is implemented as part of the Delivery Function (DF)). The P-CSCF commands the GPRS Gateway Support Node (GGSN) to make a copy of RTP-stream (media streams) and forward them it to the LIG. In FIG. 6, the monitoring terminal corresponds to the LEMF node, the latter being 3GPP terminology. According to 3GPP, the H3 and H2 interfaces carry user and signalling data respectively from the interception node to the monitoring terminal. According to the present invention, these interfaces are "merged" into one or more multimedia calls.

It will be appreciated by the person of skill in the art that various modifications may be made to the above described embodiment. For example, the LI subscriber database available to the MSC may define for subscribers on whom an interception warrant has been place, whether the reverse and forward channels are to be intercepted, or whether only one of these channels is to be intercepted. This information is signaled to the LIG.

Whilst in the scenario described with reference to FIG. 3 the terminals A and B are H.324 terminals whilst the intercepting terminal is an H.323 terminal, other scenarios are possible. These include:

1. A and B terminals are H.324 terminals. The monitoring centre has an H323 terminal. The LIG performs H245-H245 mapping between two half calls and two complete calls. The LIG also performs TDM/H223 to IP/RTP interworking.
2. A and B terminals are H324 terminals. The monitoring centre has an H324 terminal. The LIG performs H245-H245 mapping between two half calls and two complete calls.
3. A and B terminals are H324 terminals. The monitoring centre has a SIP terminal. The LIG performs H245-SIP mapping between two half calls and two complete calls. The LIG also performs TDM/H223 to IP/RTP interworking.
4. A and B terminals are SIP terminals. The monitoring centre has an H323 terminal. The LIG performs SIP-H245 mapping between two half calls and two complete calls.
5. A and B terminals are SIP terminals. The monitoring centre has an H324 terminal. The LIG performs SIP-H245 mapping between two half calls and two complete calls. The LIG also performs TDM/H223 to IP/RTP interworking.
6. A and B terminals are SIP terminals. The monitoring centre has a SIP terminal. The LIG performs SIP-SIP mapping between two half calls and two complete calls.

In the SIP embodiment of FIG. 5, it might sometimes be the case that intercepted data does not need conversion/transcoding at the LI gateway. In that case, the P-CSCF might instruct the GGSN to forward intercepted data directly to the monitoring terminal. No multimedia call need be established between the LI gateway and the monitoring terminal.

The invention claimed is:

1. A method of performing lawful interception of a first multimedia call between first and second terminals, the method comprising:

detecting the initiation of the first multimedia call at monitoring equipment located in a call path of the first multimedia call;

forwarding from the monitoring equipment to a gateway, parameters defining at least one of a forward channel and a reverse channel of the first multimedia call;

emulating a multimedia terminal at said gateway and setting up a second multimedia call between the emulated terminal and a monitoring terminal, said gateway performing the complete media control protocol transactions with the monitoring terminal based upon the received parameters and wherein said gateway maps protocols utilized in the first multimedia call to protocols used in the second multimedia call; and following the initiation of the first multimedia call, intercepting forward or reverse channel data at said monitoring equipment, routing the intercepted data to said gateway, and transmitting the data to the monitoring terminal over the forward channel of the second multimedia call;

wherein the second multimedia call includes a first gateway call between the gateway and the monitoring terminal and a second gateway call between the gateway and the monitoring terminal, and the step of transmitting the data to the monitoring terminal includes forwarding channel data from the intercepted call on a forward channel of the first gateway call and reverse channel data on a forward channel of the second gateway call.

2. The method according to claim 1, wherein the monitoring terminal communicates with said gateway via a broadband IP network.

3. The method according to claim 1, said monitoring equipment forwarding to said gateway, signaling messages exchanged between the first and second terminals involved in the call being intercepted.

4. The method according to claim 1, said gateway performing transcoding of intercepted channel data.

5. The method according to claim 1 and comprising setting up a call from said gateway to the monitoring terminal for each of the forward and reverse channels of the intercepted call.

6. The method according to claim 1, wherein the first and second terminals participating in the first multimedia call are H.324 terminals, and said monitoring terminal is an H.323 terminal.

7. The method according to claim 1, wherein the first and second terminals participating in the first multimedia call are Session Initiation Protocol (SIP) terminals, and said monitoring terminal is also a SIP terminal.

8. An apparatus for intercepting a multimedia call between first and second terminals, the apparatus comprising:

means for receiving from monitoring equipment located within a call path of the first multimedia call, parameters defining at least one of a forward and a reverse channel of the first multimedia call, following detection of the initiation of the first multimedia call by the monitoring equipment;

means for emulating a multimedia terminal;

means for selling up a second multimedia call between the emulated terminal and a monitoring terminal, wherein the means for emulating includes means for performing the complete media control protocol transactions with the monitoring terminal based upon the received parameters and for mapping protocols utilized in the first multimedia call to protocols used in the second multimedia call; and means for receiving intercepted forward or reverse channel data from said monitoring equipment, and for transmitting the data to the monitoring terminal over the forward channel of the second multimedia call;

wherein the second multimedia call includes a first gateway call between the gateway and the monitoring terminal and a second gateway call between the gateway and the monitoring terminal, and the means for transmitting the data to the monitoring terminal includes means for forwarding channel data from the intercepted call on a forward channel of the first gateway call and reverse channel data on a forward channel of the second gateway call.

* * * * *

UNITED STATES PATENT AND TRADEMARK OFFICE
CERTIFICATE OF CORRECTION

| | |
|---|---|
| PATENT NO. | : 7,577,422 B2 |
| APPLICATION NO. | : 10/551913 |
| DATED | : August 18, 2009 |
| INVENTOR(S) | : Laiho et al. |

It is certified that error appears in the above-identified patent and that said Letters Patent is hereby corrected as shown below:

In Column 8, Line 18, in Claim 8, delete "selling" and insert -- setting --, therefor.

Signed and Sealed this

Sixteenth Day of March, 2010

David J. Kappos
*Director of the United States Patent and Trademark Office*